G. FORNACA.
OIL FEEDING MECHANISM.
APPLICATION FILED FEB. 17, 1909.

964,637.

Patented July 19, 1910.
2 SHEETS—SHEET 1.

Witnesses
Edmund O. Dulocq
Geo. N. Kern

Inventor
Guido Fornaca
By his Attorneys
Edwards, Sager & Wooster

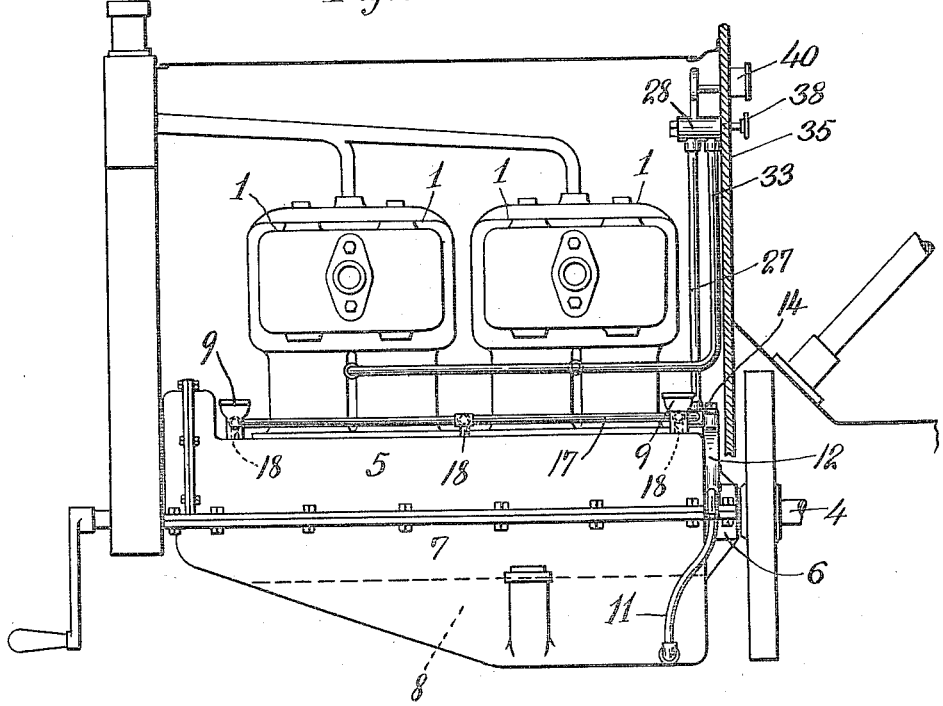
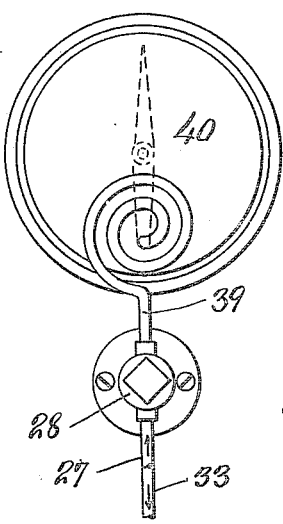
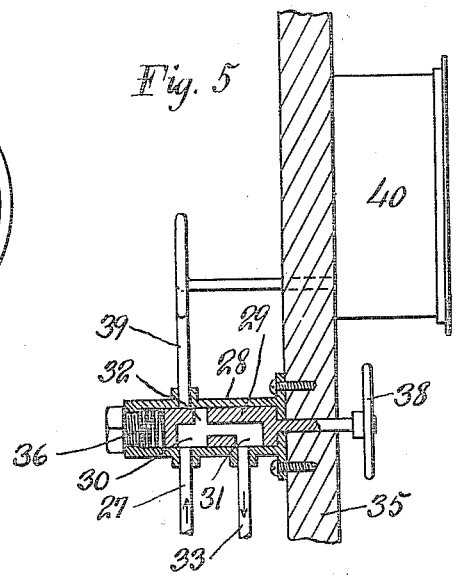

UNITED STATES PATENT OFFICE.

GUIDO FORNACA, OF TURIN, ITALY, ASSIGNOR, BY MESNE ASSIGNMENTS, TO F. I. A. T., OF POUGHKEEPSIE, NEW YORK, A CORPORATION OF NEW YORK.

OIL-FEEDING MECHANISM.

964,637.

Specification of Letters Patent.  Patented July 19, 1910.

Application filed February 17, 1909. Serial No. 478,455.

*To all whom it may concern:*

Be it known that I, GUIDO FORNACA, a subject of the King of Italy, residing at Turin, in the Province of Piedmont and Kingdom of Italy, have invented certain new and useful Improvements in Oil-Feeding Mechanism, of which the following is a full, clear, and exact specification.

This invention relates to oil feeding mechanism for an internal combustion engine and has particular reference to a mechanical oil feeding system wherein the oil is forced mechanically to the various parts of the engine, such as the crank shaft bearings, the connecting rod, and the piston, together with provision whereby the excess oil drains off and is used over and over.

A further feature of the invention relates to means whereby the operator can ascertain from a gage by an operating valve whether the oil is being supplied with the desired pressure.

The invention will be more fully shown in connection with the description of the accompanying drawings wherein—

Figure 1:
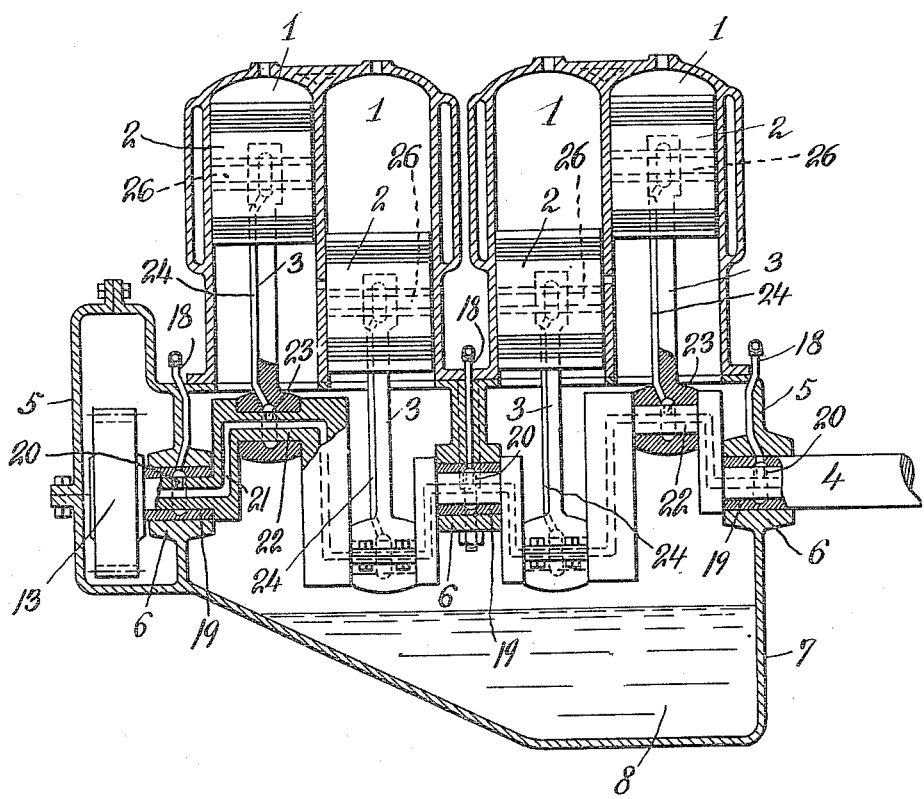
Figure 2:
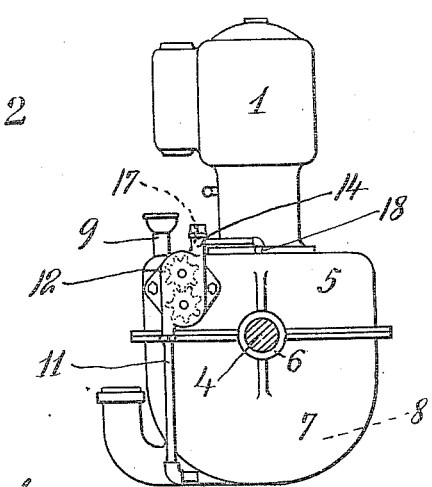

Figure 1 is a sectional view of an automobile engine embodying the invention; Fig. 2 is an end view; Fig. 3 is a side view; Fig. 4 is an oil gage to indicate the pressure; and Fig. 5 shows the valve mechanism for obtaining indications of the oil pressure.

1, 1, 1, 1 represent the cylinders of a combustion engine each having a piston 2, connecting rod 3 for driving crank shaft 4. The cylinders of the crank shaft are supported by a frame or casing 5, provided with crank shaft bearings 6, 6, 6, 6, the frame being so constructed that the bottom member 7 forms a pan having an oil reservoir 8, which can be removed from beneath the engine if desired.

9 is a filling spout for pouring oil into the reservoir 8 and from the reservoir a pipe 11 leads to an oil pump 12, which may be of any approved construction, though as herein intended it consists of what is known as a gear pump, consisting of two gears inclosed in a casing and driven from one of the cam shafts of the engine. The cam shafts are driven from the gear 13 on the crank shaft 4. The arrangement of gearing between the gear 13 and the shaft which drives the pump 12 has not been particularly illustrated, same not being a part of this invention. The discharge pipe 14 from the pump branches, and one branch 17 has taps 18 which lead to the various crank shaft bearings 6. At each crank shaft bearing there is a radial hole 20 leading to a longitudinal passage 21 extending through the crank shaft, which passage 21 may be formed by drilling holes and then plugging the ends. At each crank pin 22 a hole 23 connects with a pipe 24 carried by the connecting rods 3 leading up to the wrist pins 26, connected with the pistons 2. It will thus be seen that the oil, after passing through the pump, is supplied under pressure to the crank shaft bearings, then to the crank pin bearing, then to the wrist pin bearing; it also being observed that each of these bearings is provided with a groove in order to retain a quantity of oil and form a clear passage between the various bearings. The other branch leading from pipe 14 consists of a pipe 27 leading up to the valve casing 28 in which is a sliding plug 29 having ports 30, 31, 32, the ports 31 being so spaced as to always leave communication between pipe 27 and the pipe 33 which leads to each cylinder. For supplying oil between the piston and the cylinder, these oil pipes pass through the water jacket.

The valve casing 28 is adapted to be attached to the vehicle dash 35 and the spring 36 normally holds the plug 29 in such position that the port 32 is closed. In order to operate the valve 29, a push pin 38 is provided which can be pushed inward and thereby connect port 32 with a pipe 39 leading to the pressure gage 40 without cutting off the communication between pipes 27 and 33. The gage 40 consists of a coil of expansible tubing having a pointer connected therewith by a multiplying arrangement so that the pointer will have a considerable range of travel by a slight movement of the coil and thereby indicate on the dial of the gage units of pressure.

With the oiling systems commonly employed in automobiles the operator cannot tell whether the oil is being supplied to the various bearings properly. By this gage mechanism he has simply to open the valve to admit the pressure to the gage in order to ascertain whether there is the requisite pressure in the system. If one of the pipes be plugged, the gage would indicate a higher or lower pressure than the designed operating pressure, in this way the trouble can be observed and remedied before the engine has been damaged. Furthermore, it will be observed that by this invention a forced feed oiling system is provided wherein the crank pin and connecting rod bearings are directly lubricated by oil under pressure, without depending upon any splash there may be by reason of the cranks dipping into the oil in the reservoir 8. Also, it will be seen that oil is supplied to the crank shaft bearings under pressure directly from the pump; likewise rendering the oil supply independent of the splash, and also of the inclination of the vehicle, there being provided at any angle of the vehicle, whether ascending, or descending a hill, a sufficient supply of oil from the reservoir 8 through the pump.

Modifications and changes in the specific form of parts and arrangement may be made without departing from the scope of the invention.

Having thus described the invention, what I claim is:

1. The combination in an oil feeding system with an engine, a reservoir and a pump, of means for supplying the bearings with oil under pressure and manually controllable means adapted to indicate an obstruction to the flow.

2. The combination in an oil feeding system with an engine, a reservoir and a pump, of means for supplying the bearings with oil under pressure, means adapted to indicate an obstruction to the flow and a manual normally inoperative valve for controlling said indicator.

3. In an oil feeding system, the combination of a reservoir, a pump, a branched pump discharge pipe, one branch leading to the shaft bearings, and the other branch to the interior cylinder wall, a gage responsive to pressure for indicating the condition of the system, and a manual, normally inoperative valve for controlling said gage.

4. In an oil feeding system, the combination of a reservoir, a pump, a branched pump discharge pipe, one branch leading to the shaft bearings and another to the cylinder wall, a branch from the main pump discharge pipe containing a fluid pressure indicator, and a normally closed valve controlling said indicator.

In testimony whereof I affix my signature, in presence of two witnesses.

GUIDO FORNACA.

Witnesses:
J. S. JOSEPHS,
LOUIS ALLAN.